Inventors
Donald J. Greening
Edward Q. Mead
By Thomas E Torpey
Attorney

United States Patent Office 3,350,616
Patented Oct. 31, 1967

3,350,616
TACHOMETER FAILURE PROTECTION CIRCUIT
FOR ELECTRIC MOTOR
Donald J. Greening, Thiensville, and Edward Q. Mead, Milwaukee, Wis., assignors to Cutler-Hammer, Inc., Milwaukee, Wis., a corporation of Delaware
Filed Dec. 22, 1964, Ser. No. 420,333
5 Claims. (Cl. 318—327)

ABSTRACT OF THE DISCLOSURE

A motor control system including an adjustable voltage controller with negative feedback sensing means, a tachometer providing a first motor speed feedback signal, an armature voltage feedback circuit and a circuit for substituting armature voltage feedback for tachometer feedback in the event of failure of the tachometer and thereby maintaining motor speed substantially at the preselected motor speed.

---

Figure 1:
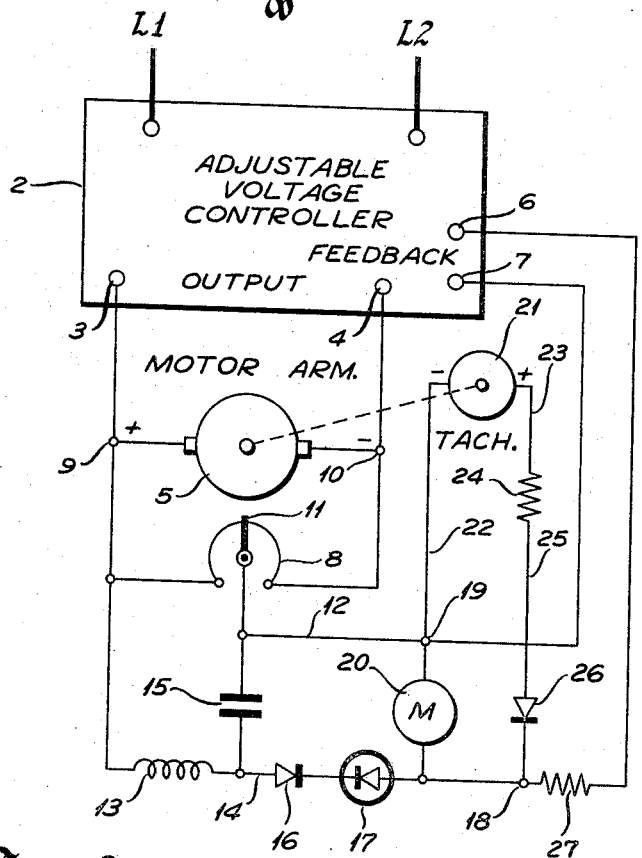

This invention relates to protective circuits for motor control systems using motor speed feedback. More specifically this invention relates to a control circuit for automatically substituting a second motor speed feedback signal for a tachometer speed feedback signal in a speed regulated motor control system in the event of failure of the tachometer.

In the control of direct current electric motors, two commonly used sources of motor speed signals are the tachometer generator and the armature countervoltage. The speed signal obtained may be used as a feedback signal in a speed regulated, adjustable voltage motor control system. The speed signal in such systems serves as a negative feedback; an increase in speed signal causing a decrease in power output from the controlled power source and a decrease in speed signal causing an increase in power to the motor. In this manner, the motor speed is controlled at a preselected value.

For precise speed control, the tachometer is preferred over the armature voltage feedback because its output is more accurately proportional to motor speed over wide speed ranges and differing operating conditions. However, the tachometer has the drawback that it is subject to occasional failure. Although such failures occur infrequently, the results of such occurrences can be serious. For instance, when controlling a piece of machinery such as a printing press at low threading speed, a failure of the tachometer and resultant drop of the speed signal to zero will cause the sudden acceleration of the machine to full speed. Such an unexpected increase in speed can be damaging to equipment and hazardous for operating personnel.

It is therefore an object of this invention to provide circuit means in an electrical motor control system for protecting against failure of the primary source of speed feedback witout unduly interfering with or complicating the operation of the system.

It is a more specific object of this invention to provide circuit means in an adjustable voltage, speed regulated D.C. motor control system for automatically substituting armature voltage feedback for tachometer feedback in the event of failure of the tachometer.

It is another object of this invention to provide means for accomplishing the aforedescribed objects with a minimal consequential change in motor speed regardless of the speed point of the motor at the time of failure of the primary source of motor speed feedback.

It is still another object of this invention to provide a device of the aforedescribed type which is of low cost and will function reliably with a minimum of maintenance.

Other objects and advantages of this invention will be evident to those skilled in the art upon reference to the following description and claims.

While the device hereinafter described is adapted to fulfill the objects stated, it is to be understood that it is not intended that the invention be confined to the particular preferred embodiment disclosed since it is susceptible of various modifications without departing from the scope of the appended claims.

Figure 2:
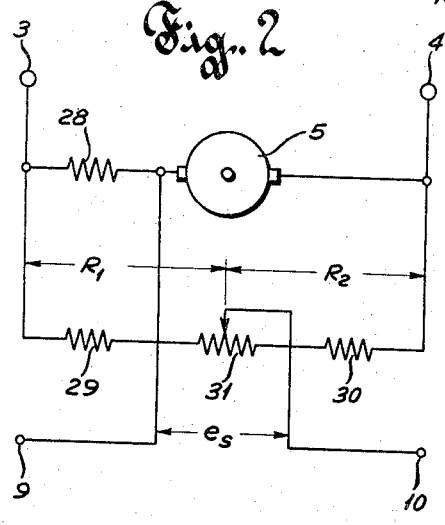

In the drawings:

FIGURE 1 is a circuit diagram of an adjustable voltage, speed regulated motor control system which embodies the invention; and FIG. 2 illustrates a modification applicable to the circuit of FIG. 1.

In the drawing there is shown an adjustable voltage speed regulated controller 2 with input connections to power lines L1 and L2. There are provided a pair of output terminals 3 and 4 through which is supplied an adjustable voltage controlled supply of electrical current to the armature of motor 5. A pair of feedback terminals 6 and 7 are furnished to receive a motor speed feedback signal. The speed regulated motor controller 2 is of a conventional type having a selectively adjustable output voltage regulated to operate motor 5 at a selected speed. Feedback terminals 6 and 7 are provided to receive a negative feedback signal which serves in a conventional manner to maintain motor 5 at the selected speed.

A potentiometer 8 is connected across the armature of motor 5 at points 9 and 10. The armature terminal voltage obtained at points 9 and 10 is for most purposes close enough to the armature countervoltage to be usable as an indication of motor speed. If desired, armature IR compensation may be introduced in the circuit to produce a speed signal more closely proportional to the armature countervoltage. An exemplary circuit is shown in FIG. 2 and explained later. A slider 11 is provided for selectively varying the fraction of armature voltage to be picked off for speed indication purposes in conductor 12. Point 9 is connected also through a serially connected inductance 13 to conductor 14. A capacitor 15 is connected between conductors 14 and 12. Capacitor 15 and inductance 13 provide a conventional filter circuit for the armature voltage to suppress undesired transients and "noise." Conductor 14 leads to a unidirectionally conducting diode 16 and a serially connected breakover or Zener diode 17 to connection point 18. Conductor 12 leads to connection point 19. A speed indicating meter 20 is connected between points 18 and 19.

The armature shaft of motor 5 is mechanically coupled to the rotor of a tachometer generator 21. The negative side of the output of tachometer generator 21 is connected through conductor 22 to connection point 19. The positive side of the tachometer output is connected through conductor 23 through a current limiting resistor 24, through conductor 25, and a unidirectionally conducting diode 26 to connection point 18. Resistor 24 is introduced for the purpose of protecting diode 26. Point 18 is connected through a resistor 27 to feedback terminal 6. Resistor 27 is inserted in the feedback circuit for current limiting purposes, and in the case where feedback terminals 6 and 7 connect to a magnetic amplifier winding in controller 2, resistor 27 serves also to regulate the ampere turns of feedback fed to the controller and to effect the proper gain and time constant for the feedback system. Connection point 19 is connected to feedback terminal 7 to complete the circuit.

The slider 11 of potentiometer 8 is adjusted so that, during normal operation of the system, the signal voltage appearing between conductors 12 and 14 is slightly less than that appearing between conductors 22 and 25 of the tachometer feedback circuit. In a typical system, with the motor running at rated speed, the tachometer output appearing between conductors 22 and 25 might typically be 175 volts. The slider 11 would then, for example, be adjusted so that the voltage between point 9 and conductor 12 would be 160 volts under the same conditions of motor speed. Since both the tachometer signal and the armature voltage signal are substantially proportional to motor speed, the armature voltage feedback signal between point 9 and conductor 12 would, under the aforedescribed conditions of adjustment, therefore be slightly less, over the entire speed range, than the tachometer signal appearing between conductors 22 and 25. The difference between these two speed signals would, of course, also be substantially proportional to the speed of the motor.

Because of the arrangement of diodes 16 and 26, the voltage appearing between points 18 and 19 will be determined by whichever of the two speed feedback signals is greater. Since the tachometer signal is normally greater in magnitude than the armature voltage signal, the voltage between points 18 and 19 will normally be determined by the tachometer signal voltage. Diode 26 is poled to allow current flow from conductor 25 to point 18. The potential of point 18 therefore is normally higher than that of conductor 14. Diode 16 is poled to prevent flow of current from point 18 to conductor 14. The potential of point 18 therefore normally substantially follows the potential of conductor 25 since the forward voltage drop of diode 26 is, for practical purposes, insignificant.

Since points 18 and 19 are connected to feedback terminals 6 and 7, the feedback signal is determined by the tachometer if the latter is operating correctly. The meter 20 indicates the voltage between points 18 and 19 and may be calibrated to read in motor speed as detected by the tachometer 21.

Should the tachometer 21 fail, the voltage signal between point 19 and conductor 25 would drop to zero. Diode 26 would block current flow from point 18 to conductor 25 and diode 16 would unblock to allow current flow from conductor 14 to point 18. The voltage between point 18 and point 19 would in that case be determined by the armature voltage feedback signal and the motor control system would then continue to operate under the influence of the automatically substituted armature voltage feedback. Since the armature voltage feedback voltage is slightly less for a given motor speed than the tachometer feedback, there would result a slight increase in motor speed in the event of tachometer failure. The motor would accelerate until the armature voltage feedback signal to terminals 6 and 7 equals the feedback signal previously delivered by the tachometer. The system would, however, continue to function in a reasonably satisfactory manner without motor runaway or a sudden increase in speed as would be the case if there were no feedback signal to the controller. Diode 26 is poled to permit current flow from conductor 25 to point 18 as long as the tachometer feedback signal exceeds the armature voltage feedback signal. In the event the armature voltage feedback signal should exceed in magnitude the tachometer feedback signal, diode 26 would block current flow from point 18 to conductor 25. Diode 26, therefore, protects against the inadvertent connection of the tachometer in reverse polarity or shorting out of the tachometer. In either case diode 26 effectively removes the tachometer from the system and allows the armature voltage feedback to control.

The function of Zener diode 17 is to block the armature feedback voltage at very low speeds. At very low speeds, the normal tachometer feedback voltage might be, for instance, about one percent of the feedback voltage at rated speed. Under these conditions, significant transients or "noise" might appear at conductors 12 and 14 in spite of the filtering action of capacitor 15 and inductor 13. These transients might be of such magnitude as to be above the level of the tachometer feedback signal. Such transients would in that case pass through diode 16 and introduce spurious signals to feedback terminals 6 and 7. Zener diode 17 overcomes this difficulty by blocking the armature voltage feedback at very low levels. If tachometer failure should occur while the motor is running at such low speed, the motor would accelerate slightly until the breakover voltage of Zener diode 17 was exceeded. The system would then quickly come under the control of the armature voltage feedback signal. The moderate increase in motor speed under these conditions would not be a problem.

FIG. 2 illustrates a form of armature IR compensation which may be introduced in the system to produce a speed signal which is more closely proportional to the armature countervoltage. A resistor 28 is connected to terminal 3 in series with the armature of motor 5. Point 9 is connected to the armature of motor 5 at a point between resistor 28 and the armature terminal. Also connected to terminals 3 and 4, but in parallel with motor 5, is a voltage divider comprising resistor 29, resistor 30 and variable potentiometer 31.

Letting:

$R_a$ = internal resistance of the motor armature
$R_d$ = resistance of resistor 28
$R_1$ = resistance between point 3 and the slider of potentiometer 31
$R_2$ = resistance between point 4 and the slider of potentiometer 31
$i_a$ = motor armature current
$e_{mt}$ = motor armature terminal voltage
$e_s$ = signal voltage desired
$e_m$ = motor counter voltage then:

$$e_s = (e_m + i_a R_a) - \frac{R_2}{R_1+R_2}(i_a R_d + e_m + i_a R_a)$$

$$= \left(1 - \frac{R_2}{R_1+R_2}\right)e_m + \left(1 - \frac{R_2}{R_1+R_2}\right)R_a - \frac{R_2}{R_1+R_2}R_d i_a$$

$$= \frac{R_1}{R_1+R_2}e_m + \left(\frac{R_1}{R_1+R_2}R_a - \frac{R_2}{R_1+R_2}R_d\right)i_a$$

If potentiometer 31 is adjusted so that $$\frac{R_2}{R_1}R_d = R_a$$

then:

$$e_s = \frac{R_1}{R_1+R_2}e_m + \frac{R_1}{R_1+R_2}\left(R_a - \frac{R_2}{R_1}R_d\right)i_a$$

$$= \frac{R_1}{R_1+R_2}e_m$$

thus eliminating the effect of armature IR drop and making $e_s$ proportional to countervoltage ($e_m$). In actual practice, the armature resistance ($R_a$) changes with temperature of the motor and this circuit therefore provides only approximate IR compensation, but it does greatly reduce the problem at low speed where IR drop is large relative to the desired countervoltage signal.

We claim:
1. In an electrical motor control system:
    (a) an electric motor;
    (b) an adjustable voltage, speed regulated controller for controlling the speed of said motor at various preselected speeds and having motor speed negative feedback signal sensing means for regulating said speed at said preselected speed;
    (c) a primary source for providing a first motor speed feedback signal substantially proportional to the speed of said motor;
    (d) a secondary source for providing a second motor speed feedback signal substantially proportional to the speed of said motor and normally of lower magnitude than said first feedback signal over substantial- ly the entire operating speed range of said motor; and (e) means for connecting said primary source and secondary source to the feedback sensing means of said controller comprising means for automatically substituting said second feedback signal for said first feedback signal to said feedback sensing means in the event of failure of said primary source whereby the speed of said motor will increase above the preselected running speed at the time of failure to the extent caused by the difference between said first and second feedback signals existing at the time of failure of said primary source.

2. In an electrical motor control system:
(a) an electric motor;
(b) an adjustable voltage, speed regulated controller for controlling the speed of said motor at various preselected speeds and having motor speed negative feedback signal sensing means;
(c) a primary source for providing a first motor speed feedback signal substantially proportional to the speed of said motor;
(d) a secondary source for providing a second motor speed feedback signal substantially proportional to the speed of said motor and normally of lower magnitude than said first feedback signal over substantially the entire operating speed range of said motor; and
(e) means for connecting said primary source and secondary source to the feedback sensing means of said controller comprising a first unidirectional conducting means for permitting current flow from said primary source to said feedback sensing means as long as the signal from said primary source exceeds in magnitude the signal of said secondary source and for blocking current flow from said secondary source to said primary source in the event said second feedback signal exceeds said first feedback signal, and second unidirectional conducting means for blocking current flow from said primary source to said secondary source as long as said first feedback signal exceeds said second feedback signal and for permitting current flow from said secondary source to said feedback sensing means in the event the second feedback signal exceeds in magnitude said first feedback signal due to a malfunction of said primary source, whereby said second feedback signal is automatically substituted for said first feedback signal to said feedback sensing means in the event of a malfunction of said primary source and the speed of said motor will increase above the preselected running speed at the time of the malfunction to the extent caused by the difference between said first and second feedback signals existing at the time of the malfunction of said primary source.

3. In a direct current motor control system:
(a) a direct current motor;
(b) a speed regulated motor controller having a selectively adjustable output voltage regulated to operate said motor at a selected speed and having motor speed feedback signal sensing means for receiving a negative feedback signal to maintain the speed of said motor at said selected speed;
(c) a tachometer generator coupled to said motor for producing a first feedback signal voltage substantially proportional to the speed of said motor, said first feedback signal being the normally used feedback signal;
(d) circuit means for providing from the armature of said motor a second feedback signal voltage substantially proportional to the armature voltage and to the speed of said motor and normally of a magnitude slightly less than said first signal over substantially the full operating speed range of said motor; and
(e) means for connecting said tachometer generator and said circuit means to the feedback signal sensing means of said controller comprising means for automatically substituting said second feedback signal for said first feedback signal to said feedback sensing means in the event of failure of said tachometer generator, whereby the speed of said motor will increase above the selected running speed at the time of failure of said tachometer generator to the extent caused by the difference between said first and second feedback signals existing at the time of failure of said tachometer generator.

4. In a direct current motor control system:
(a) a direct current motor;
(b) a speed regulated motor controller having a selectively adjustable output voltage regulated to operate said motor at a selected speed and having motor speed feedback signal sensing means for receiving a negative feedback signal to maintain the speed of said motor at said selected speed;
(c) a tachometer generator coupled to said motor for producing a first feedback signal voltage substantially proportional to the speed of said motor, said first feedback signal being the normally used feedback signal;
(d) circuit means for providing from the armature of said motor a second feedback signal voltage substantially proportional to the armature voltage and to the speed of said motor and normally of a magnitude slightly less than said first signal over substantially the full operating speed range of said motor; and
(e) means for connecting said tachometer generator and said circuit means to the feedback signal sensing means of said controller comprising a first unidirectional conducting means for permitting current flow from said tachometer to said feedback signal sensing means as long as said first signal voltage exceeds in magnitude said second signal voltage and for blocking current flow from said circuit means to said tachometer generator in the event said second signal voltage exceeds said first signal voltage, and second unidirectional conducting means for blocking current flow from said tachometer generator to said circuit means as long as said first signal voltage exceeds said second signal voltage and for permitting current flow from said circuit means to said feedback sensing means in the event the second signal voltage exceeds in magnitude said first signal voltage due to a malfunction of said tachometer generator, whereby said second signal voltage is automatically substituted for said first feedback signal to said feedback sensing means in the event of a malfunction of said tachometer generator and the speed of said motor will increase above the selected sensing speed at the time of the malfunction to the extent caused by the difference between said first and second signal voltages at the time of the malfunction of said tachometer generator.

5. The invention as defined in claim 4, together with a breakover conducting device connected in series with said second unidirectional conducting device and poled to block current flow from said circuit means at low motor speed but, by breakover at higher motor speeds, to permit current flow from said circuit means to said feedback sensing means if said second signal voltage exceeds said first signal voltage.

References Cited

UNITED STATES PATENTS 2,940,030    6/1960    Mueller _____ 318—327
3,131,342    4/1964    Wilkerson _____ 318—327

ORIS L. RADER, *Primary Examiner.*

J. J. BAKER, *Assistant Examiner.*